UNITED STATES PATENT OFFICE.

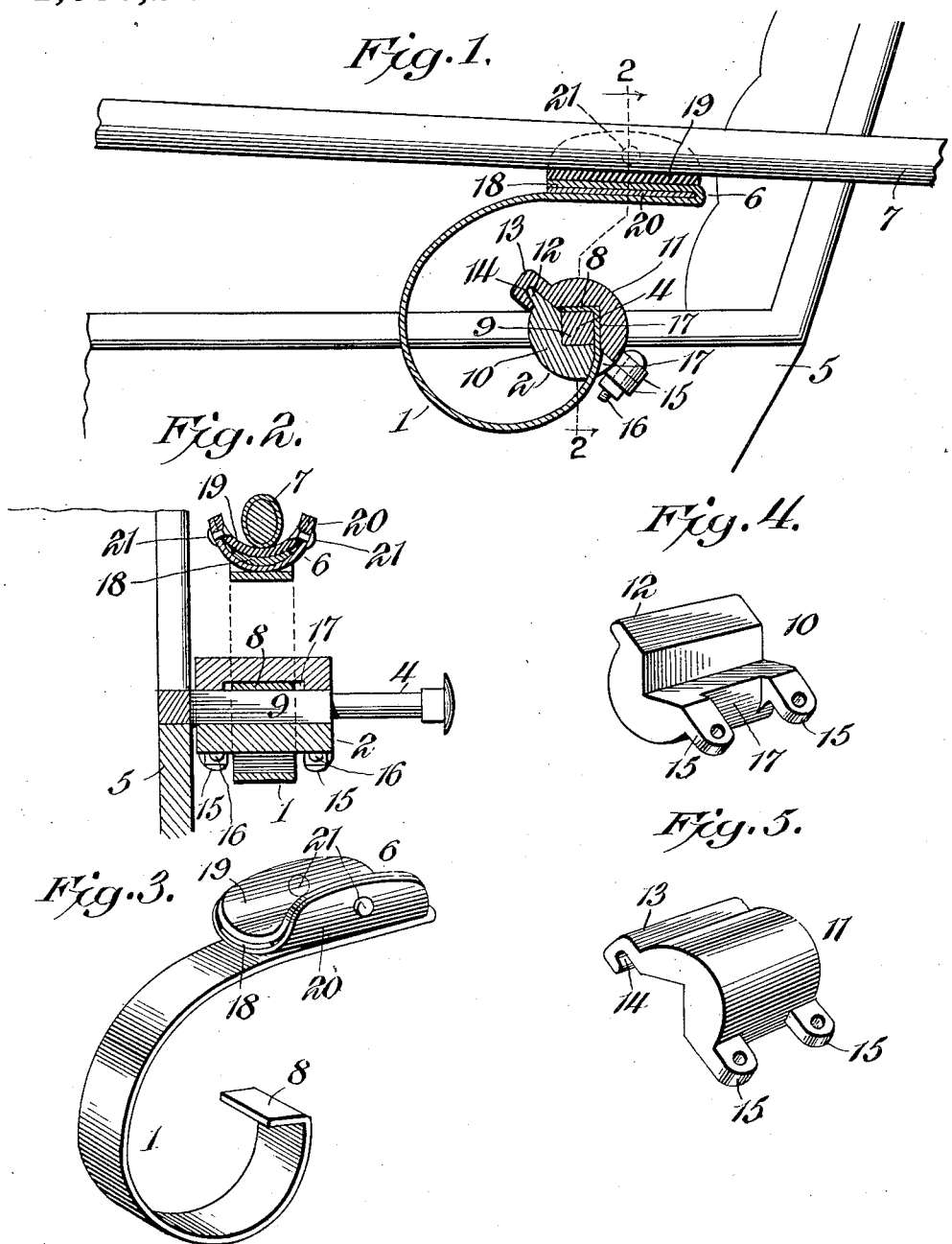
F. X. SCHAD.
SPRING TOP SUPPORT FOR VEHICLES.
APPLICATION FILED NOV. 22, 1911.
1,035,246.
Patented Aug. 13, 1912.
Frank X. Schad, Inventor,

FRANK X. SCHAD, OF GAINESVILLE, TEXAS.

SPRING TOP-SUPPORT FOR VEHICLES.

1,035,246.           Specification of Letters Patent.     Patented Aug. 13, 1912.

Application filed November 22, 1911. Serial No. 661,738.

*To all whom it may concern:*

Be it known that I, FRANK X. SCHAD, a citizen of the United States, residing at Gainesville, in the county of Cooke and State of Texas, have invented a new and useful Spring Top-Support for Vehicles, of which the following is a specification.

The invention relates to improvements in spring top supports for vehicles.

The object of the present invention is to improve the construction of spring top supports for buggies and other vehicles, and to provide a simple, inexpensive and efficient top support, adapted to be easily applied to a buggy, or similar vehicle, and capable of adjustment to suit different styles and makes of vehicles.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a vertical longitudinal sectional view of a vehicle top support, constructed in accordance with this invention and shown applied to a portion of the vehicle. Fig. 2 is a transverse sectional view, taken substantially on the line 2—2 of Fig. 1. Fig. 3 is a detail perspective view of the spring and the rest or seat. Figs. 4 and 5 are detail perspective views of the sections or members of the clamp.

Like numerals of reference designate corresponding parts in all the figures of the drawing.

In the accompanying drawing in which is illustrated the preferred embodiment of the invention, the vehicle top support comprises in its construction a curved spring 1, a clamp 2 for securing one end of the spring to the pivot stud 4 of a buggy 5 or similar vehicle, and a rest or seat 6 carried by the free end of the spring and arranged to receive the rear bow 7 of the buggy top when the latter is lowered. The spring, which may consist of one or more coils or bends to secure the desired resiliency or cushioning action, has its attached end 8 bent at an angle to fit the top and rear faces of the squared portion 9 of the pivot stud, and it hooks on or saddles over the pivot stud to subject the latter to the weight of the vehicle top and relieve the clamp of strain incident to both the weight and vibration of the vehicle top.

The clamp 2, which is in the form of a sleeve to embrace and engage the hooked terminal of the spring and the squared portion of the pivot stud, is split longitudinally, being composed of two sections 10 and 11 of approximately semi-cylindrical form. The exterior of the sections is curved and the interior is approximately V-shaped to conform to the polygonal stud. The section 10 is provided at its upper edge with a longitudinal lip 12, and the other section 11 is provided with an approximately hooked-shaped flange 13, having a groove 14 to receive the lip and co-acting with the latter to provide an open hinged joint to permit the sections of the clamp to adjust themselves to pivot studs of different sizes, so that the vehicle top support may be applied to different styles and makes of buggies and similar vehicles. The lip 12 is flat and extends the entire length of the sleeve, and the flange 13, which also extends the entire length of the sleeve, fits over and forms a cap for the lip. The sections are provided at the bottom with perforated lugs or ears 15, arranged at the ends of the sections and receiving bolts 16 for connecting the sections or members of the clamp for securing the same in their engagement with the pivot stud. The section or member 11 is provided in its inner face with a recess 17, terminating adjacent to the plane of the lugs and being of a length greater than the width of the spring and permitting an adjustment of the latter within the clamp to aline the seat or rest with the rear bow. The other section or member of the clamp is recessed or cut away at the bottom at 17 to provide an opening for the spring, which extends downwardly and forwardly from the bottom of the clamp. Both bolts may be of sufficient length to permit the necessary adjustment of the clamp, or bolts of different lengths may be employed to secure that result.

The free end of the spring is bent or folded upwardly and backwardly upon its upper face to provide an engaging terminal portion 18, which clamps the rest or support against the body portion of the spring, whereby the rest or seat is securely fastened to the spring and is readily applied to the same without piercing the spring for rivets or similar fastening devices and thereby weakening the same. The rest or seat, which is curved in cross section, is recessed and fits the rear bow, consists of a lining 19 of leather, or other yieldable or cushioning material, and a shield or backing 20 of sheet metal, or other suitable reinforcing metal inserted between the terminal portion of the spring and the body portion thereof in the bend and clamped by the bent end of the spring. The lining is secured to the backing or shield by means of rivets 21, piercing the lining and the backing or shield at opposite sides of the spring and at points spaced from the same. The rear bow is received within the rest or seat and the device yieldably supports the buggy top and cushions and prevents injury to the same when the top is lowered and while the vehicle is traveling over rough surfaces.

Having thus fully described my invention, what I claim as new and desire to secure by Letters Patent, is:

1. A vehicle top support including a spring having one of its terminals free and bent or folded upwardly and backwardly on itself to provide a terminal engaging portion, means for securing the other end of the spring to a vehicle, and a rest or seat composed of a metallic back or shield inserted between the bent terminal engaging portion of the spring and the body portion of the same and projecting from opposite sides of the latter, and a lining extending over the terminal engaging portion of the spring and covering and concealing the same and secured to the back or shield.

2. A vehicle top support including a spring having one of its terminals free and bent or folded back on itself to provide a terminal engaging portion, means for securing the other end of the spring to a vehicle, and a rest or seat composed of a transversely curved back or shield clamped between the bent terminal of the spring and the body portion of the latter and projecting from opposite sides of the spring, a flexible lining extending across the spring, and fastening devices securing the lining to the back or shield and piercing the latter at opposite sides of and at points spaced from the spring.

3. A vehicle top support including a spring provided at one end with a hooked terminal portion to engage a pivot stud, means carried by the spring to form a seat or rest for a buggy top, and a clamp consisting of a sleeve composed of two sections or members hinged together at the top and provided at the bottom with fastening means, said sections or members being adapted to embrace the hooked terminal of the spring and a pivot stud for clamping the former on the latter.

4. A vehicle top support including a spring provided at one end with a hooked terminal portion to engage a pivot stud, means carried by the spring to form a seat or rest for a buggy top, and a clamp consisting of a sleeve composed of two sections or members hinged together at the top and provided at the bottom with fastening means, one of the sections or members being provided with an interior recess of greater length than the width of the spring to permit an adjustment of the same and the other section being cut away or recessed at the bottom to provide an opening for the spring.

In testimony, that I claim the foregoing as my own, I have hereto affixed my signature in the presence of two witnesses.

FRANK X. SCHAD.

Witnesses:
J. L. TUBB,
CHAS. PRIDDY.